3,017,430
PROCESS FOR PREPARATION OF SULFONIC ACID
George B. Arnold and Herman D. Kluge, Fishkill, Raymond C. Schlicht, Hopewell Junction, and William Smolin, Beacon, N.Y., assignors to Texaco Inc., a corporation of Delaware
Filed Apr. 24, 1958, Ser. No. 730,712
14 Claims. (Cl. 260—505)

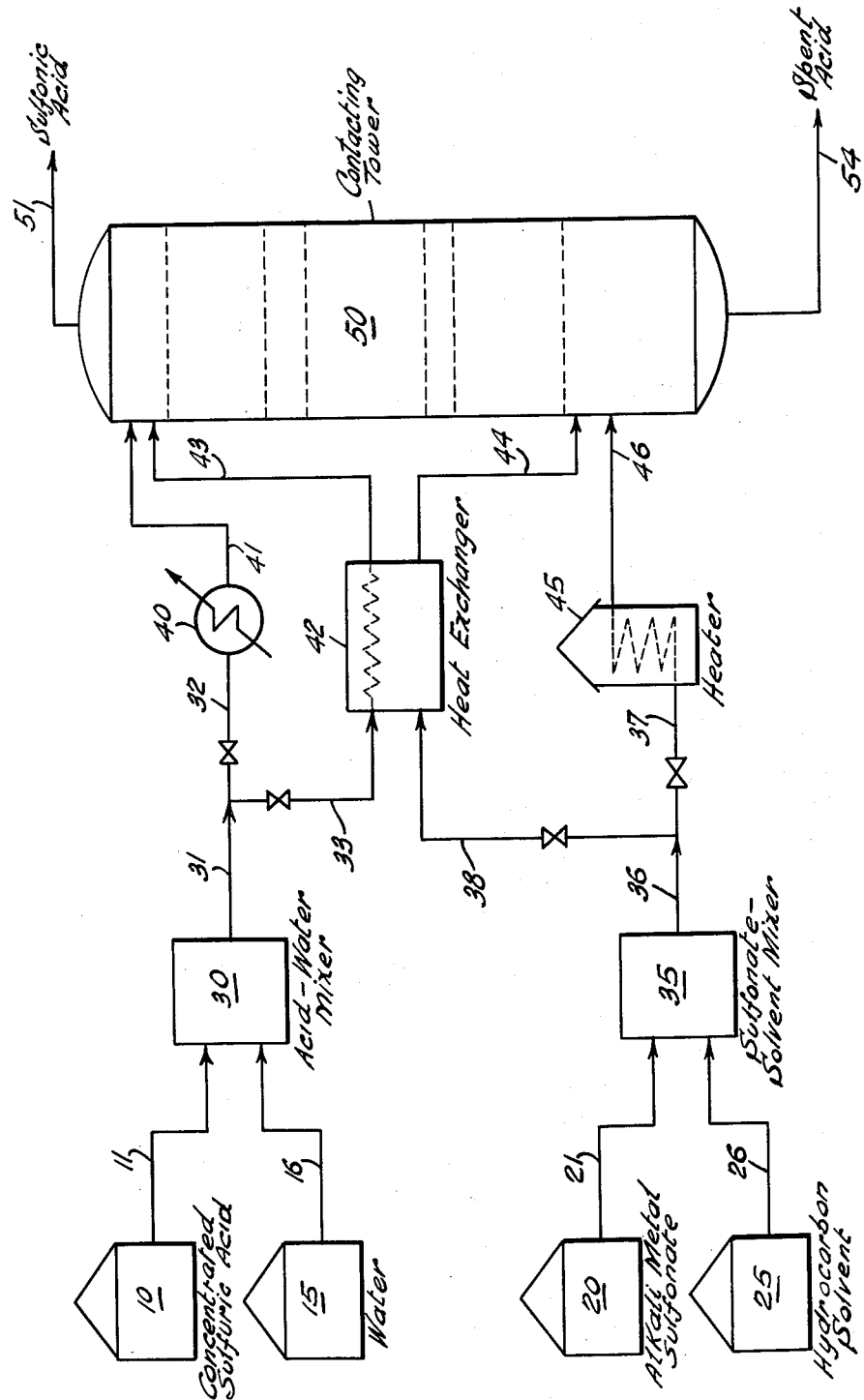

The present invention relates to the production of sulfonic acids. More specifically the present invention is directed to improvements in the production of a sulfonic acid by the reaction of sulfuric acid with an oil-soluble alkali metal sulfonate salt.

It is known that sulfonic acids can be prepared by the reaction of sulfuric acid with metal sulfonate salts and in particular with oil-soluble alkali metal sulfonate salts. One of such known methods for the preparation of sulfonic acid comprises the batch wise conversion of an oil-soluble metal sulfonate salt dissolved or dispersed in a suitable organic solvent with an aqueous sulfuric acid solution and thereafter recovering the resulting formed sulfonic acid in the organic solvent from the reaction products. Among the general disadvantages attributable to batch operations, i.e., cost of equipment and materials handling problems, etc. is to be mentioned the variable quality of the sulfonic acid product thereby obtained.

Moreover, in order to improve the quality of the oil-soluble sulfonic acid produced by batch-wise operations to a satisfactory level, it has been generally necessary to resort to multi-stage operations e.g., repeatedly reacting the crude sulfonic acid reaction product of the first stage with additional quantities of aqueous sulfuric acid solution. These multi-stage batch type operations were time consuming and they were also wasteful of men, materials, and facilities.

It is known that in the preparation of detergent additives for use in lubricating oil compositions it is desirable to employ starting materials of high quality, i.e., materials substantially free from undesirable contaminants. For example, oil-soluble sulfonic acids are used as one of the starting materials in the preparation of oil-soluble alkaline earth metal sulfonates which are employed in lubricating oil compositions as detergent additives. The presence of minor amounts of alkali metal compounds, water and mineral acids in the sulfonic acid starting material is objectionable because it is then necessary to employ a greater quantity of another component of the detergent preparation process, that is the alkaline earth metal oxide or hydroxide, to offset the presence of these undesirable materials. Such a requirement causes a considerable increase in the cost of producing the detergent additive as the alkaline earth metal oxide or hydroxide is comparatively expensive. Prior attempts to avoid the presence of the aforementioned undesirable contaminants in the sulfonic acid reaction product by batch-wise operations have not been too economically successful.

We have now found that high quality oil-soluble sulfonic acids can be prepared from a reaction mixture of aqueous sulfuric acid and hydrocarbon solution of an oil-soluble alkali metal sulfonate in accordance with the hereinafter described process of the present invention.

The term "high-quality" as employed in this specification and claims is directed to oil-soluble sulfonic acids containing less than about 0.30 weight percent sodium and less than 2.5 weight percent of sulfuric acid calculated as sulfate on a solvent-free basis.

It is an object of the present invention to provide an improved process for manufacture of sulfonic acids. A further object of the invention is the preparation of oil-soluble sulfonic acids of high quality. A still further object of the invention is a continuous process for the production of oil-soluble sulfonic acids by the reaction of sulfuric acid with an oil-soluble alkali metal sulfonate and the recovery of the sulfonic acid from the reaction products.

These as well as other objects of the invention will become apparent to those skilled in the art from a consideration of the detailed description of the process of the present invention, hereinafter set forth. The accompanying drawing sets forth in schematic form one method of putting into practice the process of the invention, omitting for the sake of clarity various pumps, temperature measuring apparatus and valves.

With reference to the aforesaid drawing, concentrated sulfuric acid is continuously withdrawn from storage vessel 10 and introduced through line 11 to a mixing zone such as a tank 30, wherein the concentrated acid is admixed with water which is continuously fed from a storage vessel 15 by line 16 to the mixing zone, the mixture becoming heated due to the heat of solution. The resulting hot aqueous solution of sulfuric acid is continuously withdrawn from tank 30 and passed through line 31 and line 32 to a water cooled heat exchanger 40 forming a cooling zone, and then the partially cooled solution is continuously passed through line 41 to an upper portion of a contacting or springing tower 50.

An oil-soluble alkali metal sulfonate is continuously withdrawn from storage vessel 20 and passed through line 21 to another mixing zone such as a tank 35, wherein the sulfonate is blended with a hydrocarbon solvent. The solvent is continuously passed from storage vessel 25 through line 26 to the tank 35. The sulfonate-solvent mixture is continuously withdrawn from tank 35 through line 36 and line 37 and passed to a heater 45, wherein the temperature of the sulfonate solvent mixture is increased and then the heated mixture is continuously withdrawn from heater 45 and introduced by line 46 into a lower portion of the contacting or springing tower 50.

Optionally, the aqueous solution of sulfuric acid can be passed from tank 30 through line 31 and line 33 to indirect heat exchanger 42 wherein the temperature of the aqueous sulfuric acid stream is reduced somewhat, then the resulting solution is passed through line 43 to an upper portion of tower 50. The cooling medium for the heat exchanger is obtained by passage of the hydrocarbon solution of the alkali metal sulfonate from tank 35 through lines 36 and 38 to heat exchanger 42 wherein the temperature of the hydrocarbon solution of alkali metal sulfonate is raised by absorption of the heat of the aqueous sulfuric acid solution. The resulting heated hydrocarbon solution is passed from the heat exchanger through line 44 to a lower portion of the contacting tower 50.

The springing or contacting tower 50 is provided with a suitable inert packing material such as, for example, glass beads, Berl saddles or Raschig rings to insure intimate contacting of the downwardly-flowing sulfuric acid solution with the ascending sulfonate-solvent mixture. Other types of contacting towers, such as, for example, a modified bubble-cap tower can be satisfactorily used in the process of the invention in place of the packed tower.

In tower 50, the dilute sulfuric acid feed stock is continuously passed downwardly through the tower, while the sulfonate-solvent mixture is continuously passed upwardly through the tower due to its lower specific gravity with respect to the aqueous sulfuric acid feed. The two moving streams are brought into contact with one another with the resultant formation of free sulfonic acid reaction products in the organic phase, and formed alkali metal bisulfate salts with minor amounts of alkali metal sulfate and spent sulfuric acid in the aqueous phase. The resulting organic phase comprises the hydrocarbon solution of the oil-soluble sulfonic acid and also contains minor amounts of residual alkali metal salts, water and sulfuric acid. The organic phase containing the oil-soluble sulfonic acid is continuously withdrawn from an upper portion of tower 50 through line 51 and passed therethrough to a suitable storage vessel, not shown. The aqueous phase containing alkali metal bisulfate and sulfate salts as well as spent sulfuric acid is continuously withdrawn from a lower portion of tower 50 through line 54 and passed therethrough to a suitable storage vessel not shown or is discarded.

We have now suprisingly found that the quality of oil-soluble sulfonic acids produced by reacting an aqueous solution of sulfuric acid with an alkali metal sulfonate can be considerably enhanced by the process of the present invention. We have found that a number of factors influence the quality of the oil-soluble sulfonic acid reaction products and each of these factors must be carefully controlled to attain the desired result, namely a high quality sulfonic acid reaction product. The critical factors influencing the quality of the reaction products are the concentration of sulfuric acid in acid feedstock, the acid dosage employed in the reaction mixture and the contacting tower temperature. Moreover, these critical factors are somewhat dependent upon each other as well as on the other processing variables i.e., sulfonate concentration feedstock rates and contacting tower design.

In carrying out the process of the present invention, it is necessary to maintain the concentration of sulfuric acid in the aqueous acid solution within the range of from about 30 weight percent to about 45 weight percent, with a concentration of about 38 percent to 42 percent by weight of sulfuric acid being preferred. The use of concentrations of sulfuric acid substantially below about 30 weight percent causes emulsification of the aqueous rich phase in the organic phase and this leads to less satisfactory operations, i.e., lower quality contaminated products. Sufuric acid concentrations above about 45 weight percent are likewise objectionable because a higher acid concentration causes the precipitation of the inorganic salts present in the aqueous spent acid phase and results in plugging of the tower.

Another of the critical factors that must be carefully controlled in order to obtain a high quality sulfonic acid reaction product by the process of the present invention is the ratio of sulfuric acid employed in the reaction mixture per equivalent of alkali metal present in the oil-soluble alkali metal sulfonate.

In the continuous process of the present invention it is necessary to employ a minimum of about 2.7 equivalents of sulfuric acid reactant based on a 38 percent to 42 weight percent aqueous sulfuric acid solution per equivalent of alkali metal present in the alkali metal sulfonate feeed stock. An acid dosage of the said aqueous acid solution below this minimum value, for example about 2.5 equivalents of 40 percent sulfuric acid for an oil-soluble alkali metal sulfonic acid having an average sodium content of about 3.2 weight percent, results in the production of sulfonic acids of objectionably high sodium content.

We have determined that sulfuric acid dosages within the range of from about 3 equivalents to about 4 equivalents of the 40 percent sulfuric acid reactant per equivalent of alkali metal present in the sulfonate reactant are most satisfactory for use in the process of the invention. The use of more than about 5 equivalents of acid is not practical from the standpoint of costs.

It is necessary to maintain the temperature of the contacting tower within comparatively narrow limits in order to prepare a high-quality oil-soluble sulfonic acid product by the continuous process of the present invention. We have determined that the tower operating temperature influences sodium removal through its effect on the system equilibrium and physical properties. In general, we have found that a mid-tower temperature within the range of from about 125° F. to about 160° F. is required to maintain the sulfonic acid products at the desired high quality. Tower temperatures were measured at a level approximately one third of the packed height above the sulfonate feed inlet. The use of operating temperatures substantially above this range results in little or no marked improvement in the quality of sulfonic acid produced. Tower temperatures below the stated 125° F. lower limit are to be avoided because such temperatures are conducive to the formation of a precipitate of alkali metal bisulfate salts in the aqueous phase. These salt deposits interfere with tower operations by plugging the lines.

We have found that most satisfactory results are obtained by maintaining the mid-tower temperature within the range of about 135° F. to 145° F. when using aqueous solutions containing 38 to 42 weight percent sulfuric acid and hydrocarbon solutions of 30 to 35 volume percent oil-soluble alkali metal sulfonate.

In the process of the invention it is desirable to maintain the temperature of the aqueous solution of sulfuric acid being introduced into the contacting tower at a temperature within the range of from about 120° F. to 160° F. with a range of from about 125° F. to 140° F. being particularly preferred for the most satisfactory results.

The alkali metal sulfonates employed in the process of the invention may be synthetic sulfonates or natural sulfonates. For purposes of this description, a synthetic sulfonate is considered to be one obtained by sulfonation of an alkylated aromatic hydrocarbon, such as benzene, while a natural sulfnate is one obtained by sulfonation of a lubricating oil range petroleum fraction. These sulfonates are substantially insoluble in water.

It is desirable to use alkali metal sulfonates having an average molecular weight of from about 390 to about 600 and comprising chiefly mono- and poly-alkylated aromatic hydrocarbons in which the total number of carbon atoms in the alkyl group side chains is from about 20 to about 30 carbon atoms. Alkali metal sulfonates comprising sulfonated dialkyl benzenes having an average molecular weight of about 400 to 500 and wherein the total number of carbon atoms in the alkyl group side chains is about 24 carbons are especially preferred. Mixtures of so called natural sulfonates and synthetic sulfonates are also advantageously employed in the process of the invention.

Sulfonate concentrations as low as about 20 volume percent and as high as 50 volume percent in hydrocarbon solvent have been found to be operable in the process of the invention. However, it has been determined that sulfonate concentrations ranging from about 25 percent to about 40 percent by volume generally result in the formation of higher-quality sulfonic acid reaction products with sulfonate concentrations of about 30 percent to about 35 percent being especially preferred.

The hydrocarbon solvent used as a diluent for the alkali metal sulfonate charge stock should be an inert, organic solvent such as a saturated paraffinic hydrocarbon, e.g., hexane or heptane, or octane, isomers thereof as well as mixtures of said hydrocarbons or isomers; or an aromatic type solvent such as benzene or toluene or mixtures thereof, or a cycloparaffinic solvent such as cyclohexane. Such solvents possess sufficiently high boiling point temperatures that they are non-volatile at the reaction temperatures employed in the process of the invention and they also have specific gravities less than that of water. In addition, these solvents are substantially immiscible with water and furthermore they are excellent solvents for the sulfonic acid reaction product. Moreover, they are readily separable from the sulfonic acid reaction products in subsequent processing. Inert hydrocarbon liquids having normal boiling point temperatures from about 140° F. to about 250° F. have been found to be satisfactory for use as solvents for the alkali metal sulfonate in the process of the present invention. It is preferred to use as solvents in the process of the invention isoheptane or methyl pentane or mixtures of methyl pentanes because of their low cost, good boiling range, excellent sulfonate solubility and immiscibility with spent aqueous sulfuric acid.

While it is preferred to carry out the process of the present invention at about atmospheric pressure, super-atmospheric pressures e.g., from about 5 to about 100 p.s.i.g. can be advantageously employed where it is desired to use lower boiling hydrocarbon solvents such as the butanes, pentanes and hexanes. However, the pressures used must be sufficient to maintain the respective phases in the liquid state until the product streams are withdrawn from the tower.

The sulfonate-solvent mixture feed stock introduced into the springing or contacting tower should be maintained at a temperature of from about 125° F. to about 160° F. with feed temperatures of about 125° F. to 140° F. being especially preferred. Feed temperatures below about 110° F. and above about 150° F. can be used but these temperature ranges are not conducive to the production of completely satisfactory sulfonic acid products.

The feeding rates for the aqueous sulfuric acid reactant and the alkali metal sulfonate-solvent mixture being introduced to the reaction zone are largely a function of contacting tower design.

In general we have found that the total flow of the combined feedstocks through a 3 inch internal diameter packed contacting tower can vary from about 75 gallons per hour per square foot of tower contacting space up to about 300 gallons per hour per square foot without adversely effecting the quality of the sulfonic acid reaction products. Desirably, a total throughput rate of from about 125 to about 200 gallons per hour per square foot should be maintained in the tower. The aqueous sulfuric acid feed stock rate should be maintained in the range of from about 150 pounds per hour per square foot to about 375 pounds per hour per square foot, preferably about 250 pounds. The sulfonate-solvent mixture feed rate is desirably kept in the range of from about 900 pounds per hour per square foot to about 1800 pounds per hour per square foot for the most satisfactory results with a rate of about 1200 pounds being particularly preferred.

The continuous process of the present invention is readily adaptable for automatic operation.

Advantageously in such arrangement the master flow control regulates the quantity of the oil-soluble alkali metal sulfonate feed to the solvent-sulfonate mixing zone. The flow rates of the hydrocarbon stream to said mixing zone as well as the flow rates of the concentrated sulfuric acid stream to the water-acid mixing zone are proportionally controlled by the sulfonate flow. The flow rate of the sulfuric acid stream controls the flow rate of water diluent to the water-acid mixing zone.

The invention is further illustrated in the following examples:

EXAMPLE I

There was charged to the upper portion of a 3 inch internal diameter acid springing tower a stream of 40 weight percent aqueous sulfuric acid. The aqueous sulfuric acid feed rate averaged about 246 pounds per hour per square foot and the feed temperature averaged 127° F.

The contacting tower was provided with 13 feet of packing material comprising 0.25 inch porcelain Berl saddles. The upper settling section of the tower had an internal diameter of 6 inches and a 4.0 gallon capacity. A 33 volume percent sodium sulfonate mixture in isoheptane was continuously fed to a lower portion of the contacting tower at a feed rate of 1180 pounds per hour per square foot of tower contacting area. The sulfonate feed was maintained at a temperature of about 126° F.

The sodium sulfonate feed stock was a blend of commercial grades of oil-soluble sodium hydrocarbon sulfonates which are present in the mixture in the following proportions: 12 parts by weight of a sodium sulfonate having an average molecular weight of 451–461, 6 parts by weight of sodium sulfonate having an average molecular weight of 451–461; 5 parts by weight of sodium sulfonate having an average molecular weight of 470. The sodium content of the sulfonate mixture thus obtained amounted to about 3.2 weight percent.

In the tower, the downwardly flowing aqueous solution of sulfuric acid was brought into contact with the upwardly flowing isoheptane solution of sodium sulfonate with the resultant formation of sulfonic acid and sodium bisulfate as the main reaction products. The formed sulfonic acid in isoheptane solution was continuously withdrawn from an upper portion of the contacting tower while the spent sulfuric acid solution containing sodium bisulfate was continuously withdrawn from a lower portion of the tower.

The sodium content of the sulfonic acid solution was determined and the results thereof are hereinafter set forth in Table A.

EXAMPLE II

Another run was also made following the procedure and employing the feedstocks of Example I above with certain changes as indicated in Table A. In this particular example the sulfuric acid dosage amounted to 2.5 equivalents per equivalent of sodium sulfonate and the aqueous sulfuric acid feed rate amounted to 205 pounds per hour per square foot. Results of a sodium analysis on the sulfonic acid product in isoheptane are shown in Table A.

EXAMPLES III AND IV

Two additional runs were made following the procedure of Example I using essentially the same operating conditions and charge stocks. The specific conditions are shown in Table A. The sulfonate charge stock mixture in these examples was obtained by mixing 12 parts by weight of a commercial sodium sulfonate having an average molecular weight of 477–479, 6 parts of another sodium sulfonate having an average molecular weight of 474–480 and 5 parts of another sodium sulfonate having an average molecular weight of 468–478. The sodium content of this mixture averaged 3.2 weight percent.

*Table A*

Charge stocks:
  40 weight percent sulfuric acid in water.
  33 volume percent sodium sulfonates in isoheptane.

|  | EXAMPLE | | | |
|---|---|---|---|---|
|  | 1 | 2 | 3 | 4 |
| Sulfuric acid solution: | | | | |
| Feed Rate, lbs./hr./sq. ft | 246 | 205 | 242 | 322 |
| Temp., °F | 127 | 128 | 125 | 124 |
| Sulfonate solution: | | | | |
| Feed Rate, lbs./hr./sq. ft | 1,180 | 1,180 | 1,180 | 1,180 |
| Temp., °F | 126 | 129 | 123 | 123 |
| Mid-tower Temperature, °F | 136 | 136 | 133 | 124 |
| Acid Dosage Equivalents (per equivalent of sodium sulfonate charged) | 3.0 | 2.5 | 3.0 | 4.0 |
| Overall Material Balance Percent | 99.1 | 101.9 | 100.5 | 98.6 |
| Product Tests: | | | | |
| Sulfonic acid, sodium content— | | | | |
| In Solution, wt. percent | 0.07 | 0.12 | 0.06 | 0.03 |
| Solvent-Free, wt. percent | 0.19 | 0.33 | 0.16 | 0.08 |
| Sulfonic acid, sulfate content— | | | | |
| In Solution, wt. percent | 0.82 | 0.88 | 0.87 | 0.82 |
| Solvent Free Basis, wt. percent | 2.22 | 2.40 | 2.35 | 2.24 |

Sulfonic acids of satisfactory high quality were also obtained by the process of the present invention using sodium sulfonates having average molecular weights of 388–392; 428–438; 499; 526; 502–503. Various mixtures of commercial grades of natural and synthetic sulfonates were also used in the continuous process of the invention with satisfactory sulfonic acid products being obtained. Runs were also conducted using as the sulfonate hydrocarbon solvent methyl pentanes, cyclohexane, and isoheptanes with satisfactory high quality sulfonic acid products being obtained.

High quality sulfonic acid products were prepared in plant operations by the continuous process of the invention using prescribed operating conditions, feedstocks, concentrations etc., set forth above. The sulfonic acid products thus produced were then reacted with alkaline earth metal hydroxide in a known manner to produce high quality oil-soluble alkaline earth metal sulfonates. These alkaline earth metal sulfonates were compounded with lubricating oils to form a premium quality motor oil.

Although a preferred embodiment of the continuous process of the present invention has been described in detail herein, it is to be understood that various changes and modifications can be made therein without departing from the spirit and scope thereof and therefore only such limitations should be imposed on our continuous process as are expressly indicated in the foregoing description.

It is claimed:

1. Continuous process for the production of an oil-soluble sulfonic acid containing less than about 0.30 weight percent sodium and less than about 2.5 weight percent sulfuric acid, calculated as sulfate on a solvent free basis, comprising continuously introducing a heated aqueous sulfuric acid solution containing from about 30 weight percent to about 45 weight percent sulfuric acid into a contacting zone, continuously feeding into said contacting zone a hot liquid hydrocarbon solvent solution of an oil-soluble alkali metal sulfonate having an average molecular weight of from about 390 to about 600 and comprising chiefly mono-alkylated and poly-alkylated aromatic hydrocarbon sulfonates in which the total number of carbon atoms in the alkyl group side chains is from about 20 to about 30 carbon atoms; continuously maintaining in said contacting zone at least about 2.7 equivalents of sulfuric acid for each equivalent of alkali metal sulfonate present therein, continuously intimately mixing in said contacting zone at a temperature within the range of from about 125° to about 160° F. said sulfuric acid solution and said alkali metal sulfonate solution, and continuously withdrawing the resulting formed sulfonic acid from said contacting zone.

2. Process as claimed in claim 1, wherein the heated aqueous solution of sulfuric acid contains from about 38 to about 42 percent by weight of sulfuric acid.

3. Process as claimed in claim 1, wherein the heated hydrocarbon solution of alkali metal sulfonate contains from about 30 to about 35 volume percent of alkali metal sulfonate.

4. Process as claimed in claim 1, in which contacting is carried out at a temperature within the range of from about 135° F. to about 145° F.

5. Process as claimed in claim 1, in which the hydrocarbon solvent is isoheptane.

6. Process as claimed in claim 1, in which the oil-soluble alkali metal sulfonate is an oil-solube sodium sulfonate having an average molecular weight of from about 400 to about 600.

7. Process as claimed in claim 1, in which said oil-soluble metal sulfonate is a dialkyl benzene sodium sulfonate having an average molecular weight of from about 400 to about 500.

8. Process as claimed in claim 1, in which at least about 3.0 equivalents of sulfuric acid are introduced into the contacting zone per equivalent of alkali metal sulfonate present therein.

9. Process as claimed in claim 1, in which the aqueous sulfuric acid solution is introduced into the reaction zone at a rate of about 250 pounds per hour per square foot of contacting area.

10. Process as claimed in claim 1, in which the hydrocarbon solution of the oil-soluble alkali metal sulfonate is introduced into the reaction zone at a rate of from about 900 pounds to about 1800 pounds per hour per square foot of contacting area.

11. Process as claimed in claim 1, in which the aqueous sulfuric solution is continuously introduced into an upper portion of the contacting zone and the alkali metal sulfonate in hydrocarbon solvent, having a specific gravity less than the aqueous sulfuric acid solution is continuously introduced into a lower portion of the contacting zone, the two solutions are contacted with one another and the resulting formed sulfonic acid product is continuously withdrawn from the upper portion of the contacting zone.

12. Continuous process for the production of an oil-soluble sulfonic acid which comprises continuously forming an aqueous sulfuric acid solution containing from about 38 weight percent to about 42 weight percent sulfuric acid, continuously adjusting the temperature of said sulfuric acid solution to a temperature within the range of from about 125° F. to about 140° F., continuously introducing the temperature-adjusted aqueous sulfuric acid solution into a contacting zone; continuously forming an isoheptane solution of an oil-soluble alkali metal sulfonate having an average molecular weight of about 400 to 500, comprising a sodium dialkyl benzene sulfonate wherein the total number of carbon atoms in the alkyl groups is from about 24 to about 30 carbon atoms, continuously heating said sulfonate solution to a temperature within the range of from about 125° F. to about 140° F., continuously introducing said heated sulfonate solution into said contacting zone; continuously maintaining in said contacting zone at least about 3 equivalents of sulfuric acid for each equivalent of alkali metal sulfonate present therein; continuously intimately mixing in the contacting zone at a temperature of about 135° to 145° F. said sulfuric acid solution and said alkali metal sulfonate solution and thereafter continuously withdrawing from the contacting zone the resulting formed sulfonic acid in isoheptane solvent.

13. Continuous process for the production of an oil-soluble sulfonic acid containing less than 0.30 wt. percent sodium and less than about 2.5 wt. percent sulfuric acid, calculated as sulfate on a solvent-free basis, which comprises continuously introducing a hot aqueous solution of sulfuric acid containing from about 30 wt. percent to about 45 wt. percent sulfuric acid into a contacting zone; continuously feeding into said contacting zone a hot hydrocarbon liquid solution of an oil-soluble alkali metal sulfonate having an average molecular weight of from about 390 to about 600 and comprising chiefly mono-alkylated and poly-alkylated aromatic hydrocarbon sulfonates in which the total number of carbon atoms in the alkyl group side chains is from about 20 to about 30 carbon atoms, said solution containing from about 30 to about 35 volume percent of alkali metal sulfonate; said solution of sulfuric acid being introduced into the contacting zone at a rate of flow which is controlled by the rate of flow of the solution of the oil-soluble alkali metal sulfonate stream, the rate of flow of said alkali metal sulfonate stream being controlled to establish and maintain in said contacting zone from about 3 to about 4 equivalents of sulfuric acid per equivalent of alkali metal sulfonate therein; continuously maintaining said contacting zone at a temperature within the range of from about 135° to about 145° F.; continuously contacting said solutions with each other in said contacting zone and forming a resultant sulfonic acid product and continuously withdrawing said sulfonic acid product from said zone.

14. Process as claimed in claim 13, in which the aqueous solution of sulfuric acid is formed by mixing separate flowing streams of concentrated sulfuric acid and water and in which the solution of the oil-soluble alkali metal sulfonate in hydrocarbon liquid is formed by mixing separate flowing streams of an oil-soluble alkali metal sulfonate and a hydrocarbon liquid and in which the rate of flow of the concentrated sulfuric acid stream and the hydrocarbon liquid stream is controlled by the rate of flow of the oil-soluble alkali metal sulfonate stream and in which the rate of flow of the water stream is controlled by the rate of flow of the concentrated sulfuric acid stream.

References Cited in the file of this patent

UNITED STATES PATENTS 2,218,174     Lazar et al. _____ Oct. 15, 1940

FOREIGN PATENTS 827,065     Germany _____ Jan. 7, 1952